(12) United States Patent
Jovovic et al.

(10) Patent No.: US 12,377,710 B2
(45) Date of Patent: Aug. 5, 2025

(54) THERMOPHYSIOLOGICALLY-BASED MICROCLIMATE CONTROL SYSTEM

(71) Applicant: Gentherm Incorporated, Novi, MI (US)

(72) Inventors: Vladimir Jovovic, Pasadena, CA (US); Ankit Tiwari, Farmington Hills, MI (US); Alan James Valentine Chewter, Ypsilanti, MI (US)

(73) Assignee: Gentherm Incorporated, Novi, MI (US)

( * ) Notice: Subject to any disclaimer, the term of this patent is extended or adjusted under 35 U.S.C. 154(b) by 418 days.

(21) Appl. No.: 17/791,022

(22) PCT Filed: Feb. 5, 2021

(86) PCT No.: PCT/US2021/016723
§ 371 (c)(1),
(2) Date: Jul. 6, 2022

(87) PCT Pub. No.: WO2021/158856
PCT Pub. Date: Aug. 12, 2021

(65) Prior Publication Data
US 2023/0036016 A1 Feb. 2, 2023

Related U.S. Application Data

(60) Provisional application No. 62/970,409, filed on Feb. 5, 2020.

(51) Int. Cl.
*B60H 1/00* (2006.01)
*B60H 1/22* (2006.01)

(52) U.S. Cl.
CPC ..... *B60H 1/00742* (2013.01); *B60H 1/00878* (2013.01); *B60H 1/2218* (2013.01);
(Continued)

(58) Field of Classification Search
CPC ............ B60H 1/00742; B60H 1/00878; B60H 1/2218; B60H 1/2225; B60H 1/2227
See application file for complete search history.

(56) References Cited

U.S. PATENT DOCUMENTS 6,727,467 B1 4/2004 Hadzizukic et al.
2010/0019050 A1 1/2010 Han et al.
(Continued)

FOREIGN PATENT DOCUMENTS

CN 104180446 B 10/2017
DE 102016120960 A1 5/2017
(Continued)

OTHER PUBLICATIONS

International Search Report and Written Opinion for International Application No. PCT/US2021/016723 mailed May 21, 2021.
(Continued)

*Primary Examiner* — Steven S Anderson, II
(74) *Attorney, Agent, or Firm* — Carlson, Gaskey & Olds, P.C.

(57) ABSTRACT

A method of controlling an occupant microclimate environment includes determining a heat balance on an occupant in a microclimate environment based upon a thermal model of the heat transfer effects on the occupant, estimating an overall thermal sensation of the occupant based upon the heat balance, referencing a target overall thermal sensation of the occupant, calculating an error between the estimated overall thermal sensation and the target overall thermal sensation, and controlling at least one thermal effector in at least one zone in the microclimate environment to reduce the error in overall thermal sensation while maintaining all effectors within limits of temperature and flow rate that ensure occupant comfort.

19 Claims, 12 Drawing Sheets

(52) U.S. Cl.
CPC ......... *B60H 1/2225* (2013.01); *B60H 1/2227* (2019.05); *B60H 2001/2265* (2013.01)

(56) References Cited

U.S. PATENT DOCUMENTS

| | | | |
|---|---|---|---|
| 2013/0061603 A1 | 3/2013 | Li | |
| 2014/0090513 A1 | 4/2014 | Zhang et al. | |
| 2017/0368907 A1* | 12/2017 | Yoneda | G06V 10/143 |
| 2018/0251007 A1 | 9/2018 | Neveu et al. | |
| 2019/0320503 A1 | 10/2019 | Han et al. | |
| 2020/0317024 A1* | 10/2020 | Kaushik | B60H 1/0073 |
| 2020/0331320 A1* | 10/2020 | Saeki | B60H 1/00657 |
| 2021/0008960 A1* | 1/2021 | Saitou | B60H 1/00207 |

FOREIGN PATENT DOCUMENTS

| | | |
|---|---|---|
| DE | 112017001440 T5 | 12/2018 |
| DE | 102019109370 A1 | 10/2019 |
| EP | 2517907 A2 | 10/2012 |
| JP | 2003022288 A | 1/2003 |
| JP | 2017536287 A | 12/2017 |
| JP | 2018004241 A | 1/2018 |
| JP | 2018075913 A | 5/2018 |
| JP | 2019043511 A | 3/2019 |
| JP | 2019147508 A | 9/2019 |
| JP | 2019177804 A | 10/2019 |
| WO | 2018049159 A1 | 3/2018 |
| WO | 2020011290 A1 | 1/2020 |
| WO | 2020065218 A1 | 4/2020 |

OTHER PUBLICATIONS

International Preliminary Report on Patentability for International Application No. PCT/US2021/016723 mailed Dec. 21, 2021.
German Office Action for German Application No. 112021000304.6 mailed Oct. 6, 2023.
Japanese Office Action for Japanese Application No. 2022-547231 mailed Jul. 25, 2023.

* cited by examiner

THERMOPHYSIOLOGICALLY-BASED MICROCLIMATE CONTROL SYSTEM

CROSS-REFERENCE TO RELATED APPLICATIONS

This application claims priority to U.S. Provisional Application No. 62/970,409 filed on Feb. 5, 2020, and is incorporated herein by reference.

BACKGROUND

In traditional automotive HVAC or climate systems, the control system uses temperature from sensors mounted in different locations within the cabin or calculates temperature using a cabin thermal model. In recent years, seat based microclimate systems have become more desirable because of their fast time to comfort and lower energy consumption compared to prior systems.

An automotive seat-based microclimate system has many conductive, convective and radiative devices, like heater mats, TEDs, PTCs, blowers, mini-compressor systems and radiant panels located in the seat and surrounding area. Calculating local effective temperatures and heat transfer rates to the human body accurately for local heating/cooling device control is important to local thermal comfort, but difficult with current systems.

The current methods for automotive seat based microclimate system are discrete ON/OFF or modulated power (PWM) control of each individual device available in that vehicle (e.g. seat heater, central AC blower speed and temperature, neck conditioner etc.) based on fixed temperature setpoints (typically 3 to 5 discrete levels). The occupant manually selects one of these predefined temperature setpoints to adjust for changing conditions in the vehicle and human body. Additionally, since levels are discrete, the user may be forced to change levels to "hunt" for an unobtainable setting. Thus, it is desirable to incorporate an automated microclimate system in a vehicle that achieves occupant thermal comfort with little or no control input necessary from the occupant, and without the need for the user to manually coordinate the control of various devices in the vehicle over time and other ambient conditions

SUMMARY

In one exemplary embodiment, a method of controlling an occupant microclimate environment includes determining a heat balance on an occupant in a microclimate environment based upon a thermal model of the heat transfer effects on the occupant, estimating an overall thermal sensation of the occupant based upon the heat balance, referencing a target overall thermal sensation of the occupant, calculating an error between the estimated overall thermal sensation and the target overall thermal sensation, and controlling at least one thermal effector in at least one zone in the microclimate environment to reduce the error in overall thermal sensation while maintaining all effectors within limits of temperature and flow rate that ensure occupant comfort.

In a further embodiment of any of the above, the heat balance is a sum of convection, conduction and radiation on the occupant corresponding an occupant heat loss.

In a further embodiment of any of the above, the heat balance is calculated based upon vehicle ambient temperature, cabin temperature and occupant information.

In a further embodiment of any of the above, the occupant information includes at least three of occupant weight, occupant height, occupant gender and occupant clothing.

In a further embodiment of any of the above, the heat balance includes thermal input from the at least one thermal effector in the at least one zone. The thermal input is provided as a transfer function of the at least one thermal effector.

In a further embodiment of any of the above, the heat balance on the occupant is determined using an equivalent homogeneous temperature.

In a further embodiment of any of the above, the estimated overall thermal sensation is represented by the equation $$OTSest = \frac{6}{1 + \exp(-A \times (HeatLoss_{Body} + B))} - 3.$$

$HeatLoss_{Body}$ corresponds to the heat flux of the occupant in the microclimate environment, and A and B are coefficients relating to seasonal effects on the heat flux.

In a further embodiment of any of the above, the estimated occupant thermal sensation and the target occupant thermal sensation are quantified using the Predicted Mean Vote scale.

In a further embodiment of any of the above, the target overall thermal sensation is provided by a default value as adjusted by any manual adjustments by the occupant via a climate control input.

In a further embodiment of any of the above, the error is a difference between the target occupant thermal sensation and the estimated occupant thermal sensation. A positive error is indicative of a cool occupant and a negative error is indicative of a warm occupant. With a positive error the at least one thermal effector is activated to warm the occupant and other thermal effectors used to cool the occupant are inactive. With a negative error the at least one thermal effector is activated to cool the occupant and other thermal effectors used to warm the occupant are inactive.

In a further embodiment of any of the above, the at least one zone includes multiple zones. Each of the multiple zones have at least one thermal effector.

In a further embodiment of any of the above, the multiple zones includes at least three of a head zone, a seat back zone, a seat cushion zone, a hand/arm zone and a foot/leg zone.

In a further embodiment of any of the above, the at least one thermal effector includes at least three of a climate controlled seats, a head rest/neck conditioner, a climate controlled headliner, a steering wheel, a heated gear shifter, a door panel, a heater mat, and a mini-compressor system.

In a further embodiment of any of the above, the calculating step is performed for each zone of the multiple zones. The controlling step is performed using the thermal effector in the each zone of the multiple zones.

In a further embodiment of any of the above, the heat balance on the occupant is determined using an equivalent homogeneous temperature. The estimating step uses the equivalent homogeneous temperature to determine the estimated overall thermal sensation.

In a further embodiment of any of the above, calculating step determines different errors in the multiple zones. The controlling step results in different heating and/or cooling in the multiple zones.

In a further embodiment of any of the above, the method includes multiple thermal effectors arranged in the microclimate zone. The controlling step is performed based upon a power efficiency ranking of the multiple thermal effectors.

In a further embodiment of any of the above, a controller is configured to perform the method.

In a further embodiment of any of the above, a seating system includes the controller.

In a further embodiment of any of the above, a vehicle includes the seating system.

BRIEF DESCRIPTION OF THE DRAWINGS

FIGS. 4A-C are portions of a combined diagram illustrating an example arrangement for determining the OTS of a vehicle occupant.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Vehicle manufacturers wish to provide thermal comfort to vehicle occupants automatically and without the need for the occupant to adjust temperature settings or otherwise manually control devices and/or combinations of devices to achieve occupant thermal comfort. One example system for controlling an occupant microclimate environment takes into consideration seat and occupant locations within the vehicle by using the position of the occupant within the vehicle (i.e., front or rear row, left or right) as one key factor used to determine thermal comfort for each occupant. If desired to simplify the control scheme, the driver seat can be used as the "master" location for which the system determines occupant thermal comfort, and the other seating locations within the vehicle are dependent on the driver seating location.

Figure 1:
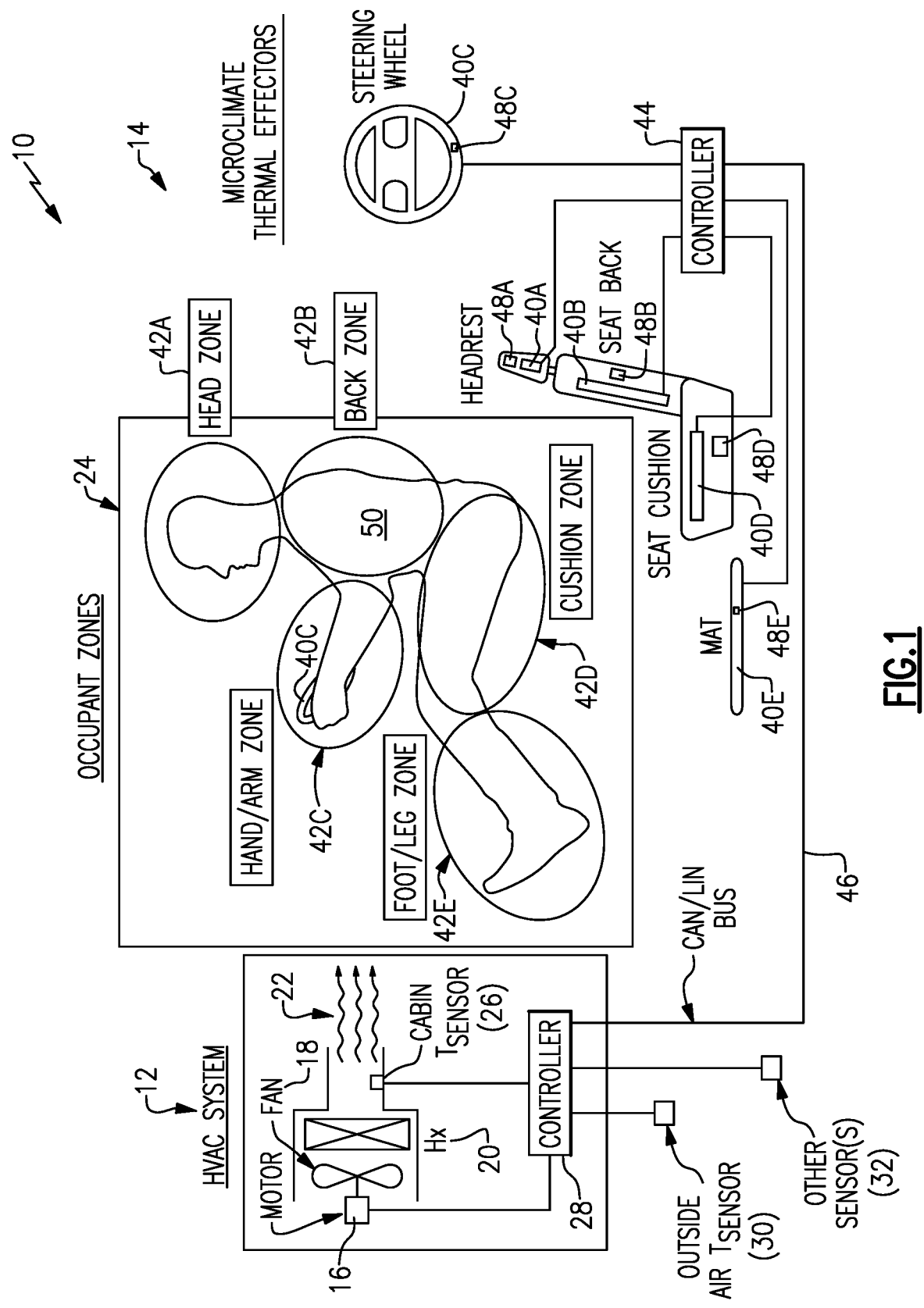
FIG. 1 schematically illustrates a thermal conditioning system that includes an HVAC system and a microclimate thermal conditioning system.

FIG. 1 schematically illustrates a thermal conditioning system 10 that includes an HVAC system 12 and a microclimate thermal conditioning system (MTCS) 14. The HVAC system 12 includes a motor 16 that drives a fan 18 which passes air through a heat exchanger 20 to provide thermally conditioned air 22 within vehicle cabin 24. A cabin temperature sensor 26 provides temperature information to a HVAC controller 28 that is operable to adjust operation of the motor 16 based on temperature readings from the cabin temperature sensor 26. The HVAC controller 28 may also receive information from an outside air temperature sensor 30 and one or more additional sensors 32, for example.

The HVAC controller 28 regulates operation of the HVAC system 12 to a temperature set point that is typically manually adjusted by the vehicle occupant. The central HVAC system 12 is insufficient to achieve thermal comfort for each specific occupant and location in many scenarios, so the MTCS 14 is provided to create a unique microclimate for each occupant in the vehicle cabin 24, thereby providing improved overall occupant thermal comfort.

The MTCS 14 may have many discrete occupant microclimate zones, or Occupant Personalization Zones (OPZs). According to ISO 145045-2:2006 (E), a human body can be divided into different body segments, such as hand, head or chest, and each segment may have a different thermal comfort temperature range. The five example zones in FIG. 1 are head, back, cushion (thigh and buttocks), foot/leg, and arm/hand. Fewer, more and/or different zones may be used if desired.

Referring still to FIG. 1, the MTCS 14 includes a plurality of discrete microclimate thermal effectors 40A-E which are each disposed in a respective OW 42A-E. In the example of FIG. 1, the OPZs 42 includes a head zone 42A, a back zone 42B, a hand/arm zone 42C, a cushion zone 42D, and a foot/leg zone 42E. A variety of the OPZs 42A-E and could be used in different vehicles. In one example, at least three of the head zone 42A, back zone 42B, hand/arm zone 42C, seat cushion zone 42D, and foot/leg zone 42E are provided.

Each OPZ 42 provides a microclimate for a specific zone in contact with a particular vehicle occupant. An example vehicle occupant 50 shown in FIG. 1 is a driver that has access to a steering wheel. Other vehicle occupants would likely not have a steering wheel, but could still have other devices that effect the climate in that zone, for example heated and cooled surfaces, radiant heating panels, HVAC vents, sun loads etc. For each of the OPZs shown 42A-E the software is configured to account thermodynamically for all of the methods of heat transfer that effect that zone, both controlled effectors including HVAC and uncontrolled loads such as radiation from the sun. The climate in that zone is then controlled according to the actual state of the climate in that zone compared with the desired state of the climate in that zone. Although only a single microclimate thermal effector 40 is shown in each OPZ 42, it is understood that multiple thermal effectors 40 could be included in a particular OPZ 42.

Figure 2:
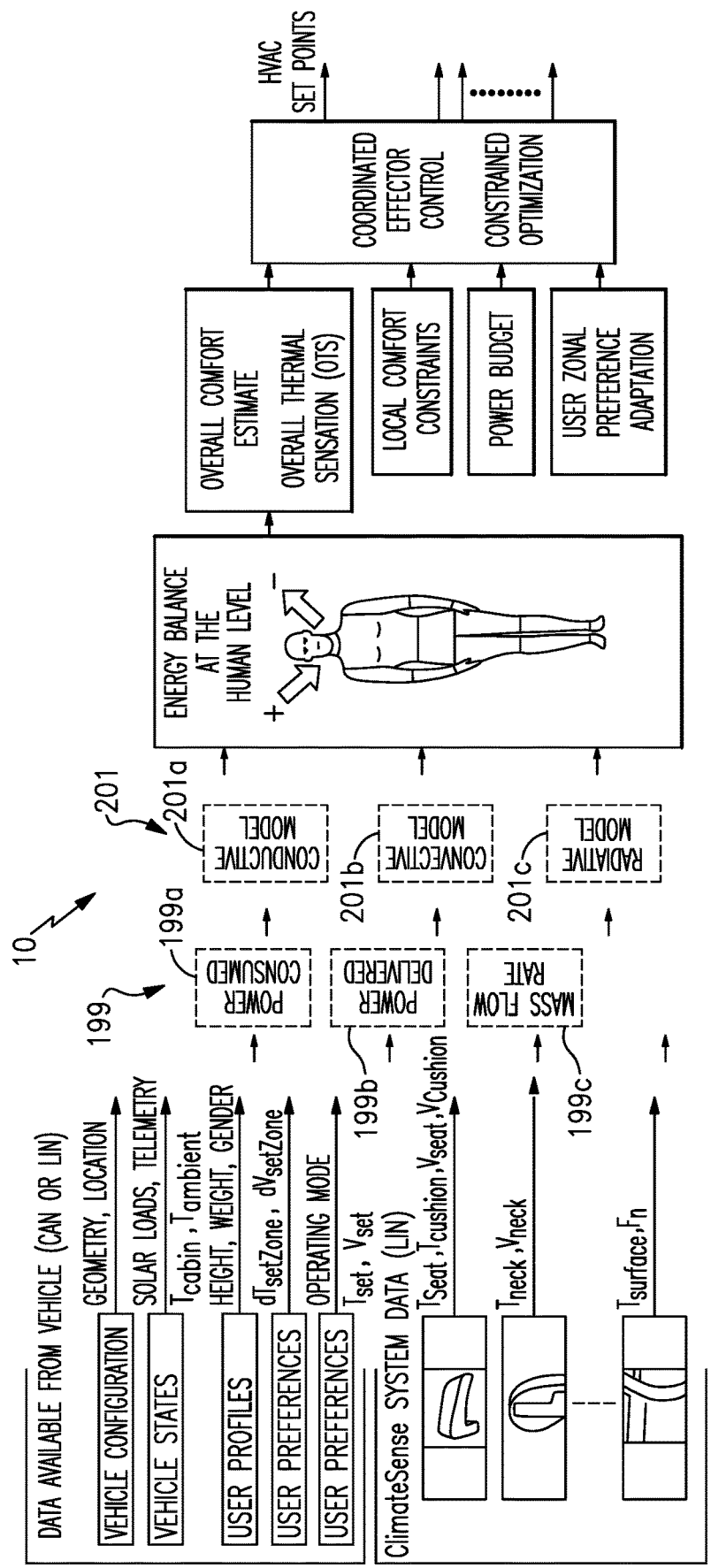
FIG. 2 illustrates a thermophysiology based software architecture for the disclosed thermal conditioning system.

A variety of thermal effectors 40 could be used in each OPZ, such as resistive electrical heaters, thermoelectric devices which use Peltier effect to provide for heating or cooling, convective thermal conditioning devices which provide for air flow (e.g., air flow from within the vehicle seat to the OPZ 42), etc. Some example thermal effectors that could be used in the system 10 include, but are not limited to, for example, climate controlled seats (see, e.g., U.S. Pat. Nos. 5,524,439 and 6,857,697), a neck conditioner mounted in a head rest or upper seat back (see, e.g., U.S. Provisional App. No. 62/039,125), a climate controlled headliner (see, e.g., U.S. Provisional App. No. 61/900,334), a climate controlled (e.g., heated) door panel and/or instrument panel, a heated controlled steering wheel (see, e.g., U.S. Pat. No. 6,727,467 and U.S. Pub. No. 2014/0090513), a heated gear shifter (see, e.g., U.S. Pub. No. 2013/0061603, etc.), an intelligent microthermal module or "iMTM" (see, e.g., International Application No. WO202011290), heater mats (which may be installed in seat and other surfaces surrounding or in contact with the vehicle occupant 50), a mini-compressor system configured to deliver a thermal effect to the vehicle occupant 50 by convective heat transfer from cooled and conditioned air (see, e.g., International Application No. WO2018049159A1), and/or a convective thermal effector capable of heating or cooling located in the seat back or cushion to achieve a personalized microclimate Referring to FIG. 1, the HVAC system is used to condition the air and control the bulk temperature of the air within the vehicle cabin (FIG. 2, Tcabin). A typical HVAC system has ducting that supplies conditioned air to the cabin using a blower moving air over a heat exchanger. A sensor monitors the temperature of the conditioned cabin air, and a controller regulates operation of the HVAC system to a velocity (FIG. 2, Vset) and a temperature set point (FIG. 2, Tset) that is typically manually adjusted by the occupant. The central HVAC system is insufficient or unable to achieve optimal thermal comfort for each specific occupant and location in many scenarios, so microclimate devices or thermal effectors are used to create a unique microclimate for each occupant in the cabin, thereby providing improved overall occupant thermal comfort. As a further challenge to providing an effective climate control system, each occupant typically has unique personal comfort preferences. That is, a particular occupant detects a level of thermal energy differently than another occupant. As a result, the exact same thermal environment within a vehicle may be perceived as comfortable by one occupant, but as uncomfortable by another occupant. To this end, this disclosure provides each occupant some ability to make manual adjustments to climate control system (FIG. 2; $dV_{setZone}$, $dV_{setZone}$) by coordinated control of both a central HVAC system or any other thermal control system in the vehicle as well as various microclimate thermal effectors.

There are numerous sources of heating and cooling within a vehicle that impact the occupant's thermal comfort. In one example, the cumulative effect of various heating and cooling sources can be represented by an equivalent homogeneous temperature (EHT) within the cabin. EHT represents the total thermal effects of the surrounding environment on an occupant as a measure of the occupant's dry heat loss, which produces a whole body thermal sensation. EHT takes into account the convective and radiative heat transfer effects on the occupant and combines these effects into a single value, which is especially useful for modelling non-uniform thermal environments. One example calculation of EHT can be found in Han, Taeyoung and Huang, Linjie, "A Model for Relating a Thermal Comfort Scale to EHT Comfort Index," SAE Technical Paper 2004-01-0919, 2004. As explained in this SAE paper, which is incorporated by reference in its entirety, the modeled thermal environment is affected by "breath level" air temperature, mean radiant temperature (MRT), air velocity within the cabin, solar load and relative humidity. However, in this paper EHT calculation does not take into account conductive heat transfer. In the current thermophysiological algorithm, the EHT calculation scheme has been modified to account for the conductive heat transfer from the seat and other contact surfaces.

The HVAC system of a vehicle conditions the bulk air within the cabin to achieve an overall cabin temperature (FIG. 2, Tcabin). Other environmental influences on the microclimate environment include vehicle ambient temperature (FIG. 2, Tambient) and solar load (FIG. 2, Solar loads) on the vehicle. These influences are accounted for in the disclosed system 10 (see, FIG. 4A, 214). One example of using EHT to achieve occupant thermal comfort is described in U.S. Provisional Application No. 62/951,289, entitled "AUTOMATIC SEAT THERMAL COMFORT CONTROL SYSTEM AND METHOD", filed on Dec. 20, 2019, which is incorporated by reference in its entirety.

As shown in FIG. 2, the input parameters from the vehicle as well as the "Climatesense" system data from the thermal effectors is translated using transfer functions 199 to determine each thermal effector's input and the HVAC input into the physical models 201 for the heat transfer balance equation. For each transfer function, the power consumption 199a, power delivery 199b and mass flow rate 199c is accounted for, as applicable.

Input parameters communicated over the vehicle's communications bus include, for example, Vehicle Configuration (adjustments for geometry and location of various components), Vehicle States (solar load variables (see, e.g., Radiative Load Model in FIG. 2C); cabin temperature, $T_{cabin}$; exterior vehicle temperature, $T_{ambient}$), User Profiles (occupant height, weight, gender), User Preferences (user change in temperature set point for a zone, $dT_{setZone}$; user change in blower set point for a zone, $dT_{setZone}$), and current HVAC Operating Modes (temperature set point for a zone, $T_{set}$; blower set point for a zone, $V_{set}$). Microclimate parameters include seat parameters (temperature of seat back surface, $T_{seat}$; temperature of seat cushion surface, $T_{cushion}$; seat back blower speed, $V_{seat}$; seat cushion blower speed, $V_{cushion}$), neck warmer parameters (temperature of neck warmer air, $T_{neck}$; velocity of neck warmer air, $V_{neck}$), and the hand warmer parameters (e.g., steering wheel; surface temperature, $T_{surface}$; transfer function, $F_n$). These and other parameters are provided to the transfer function that feed into the heat transfer models 201a, 201b, 201c.

Figure 2A:
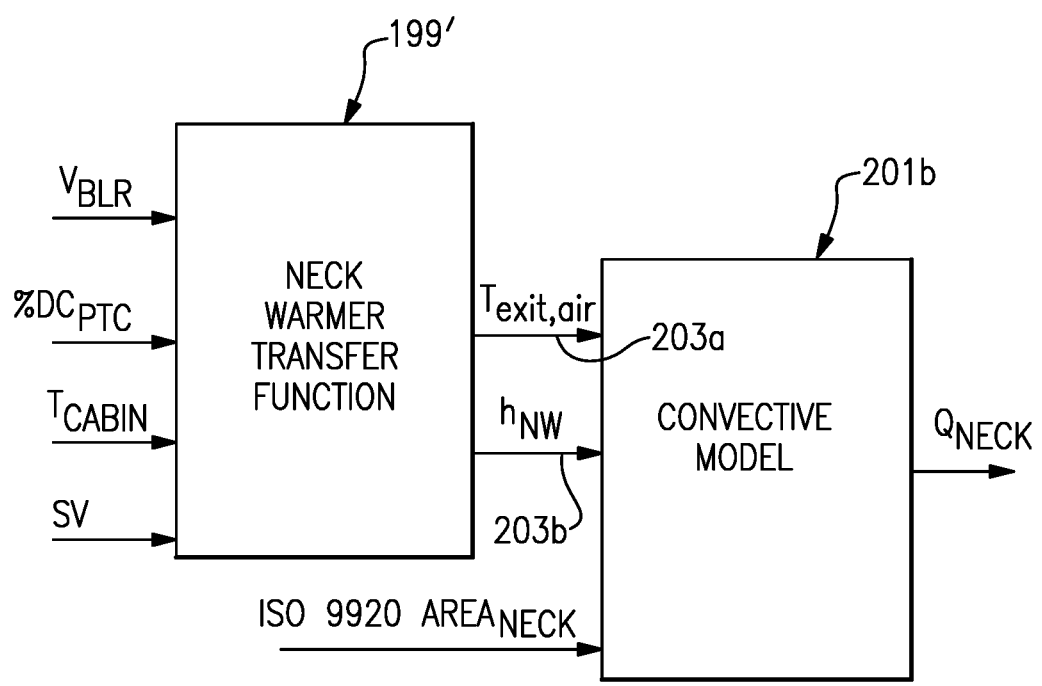
FIG. 2A is an example control for a neck warmer using a convective heat transfer model for use in the system shown in FIG. 2.
Figure 2B:
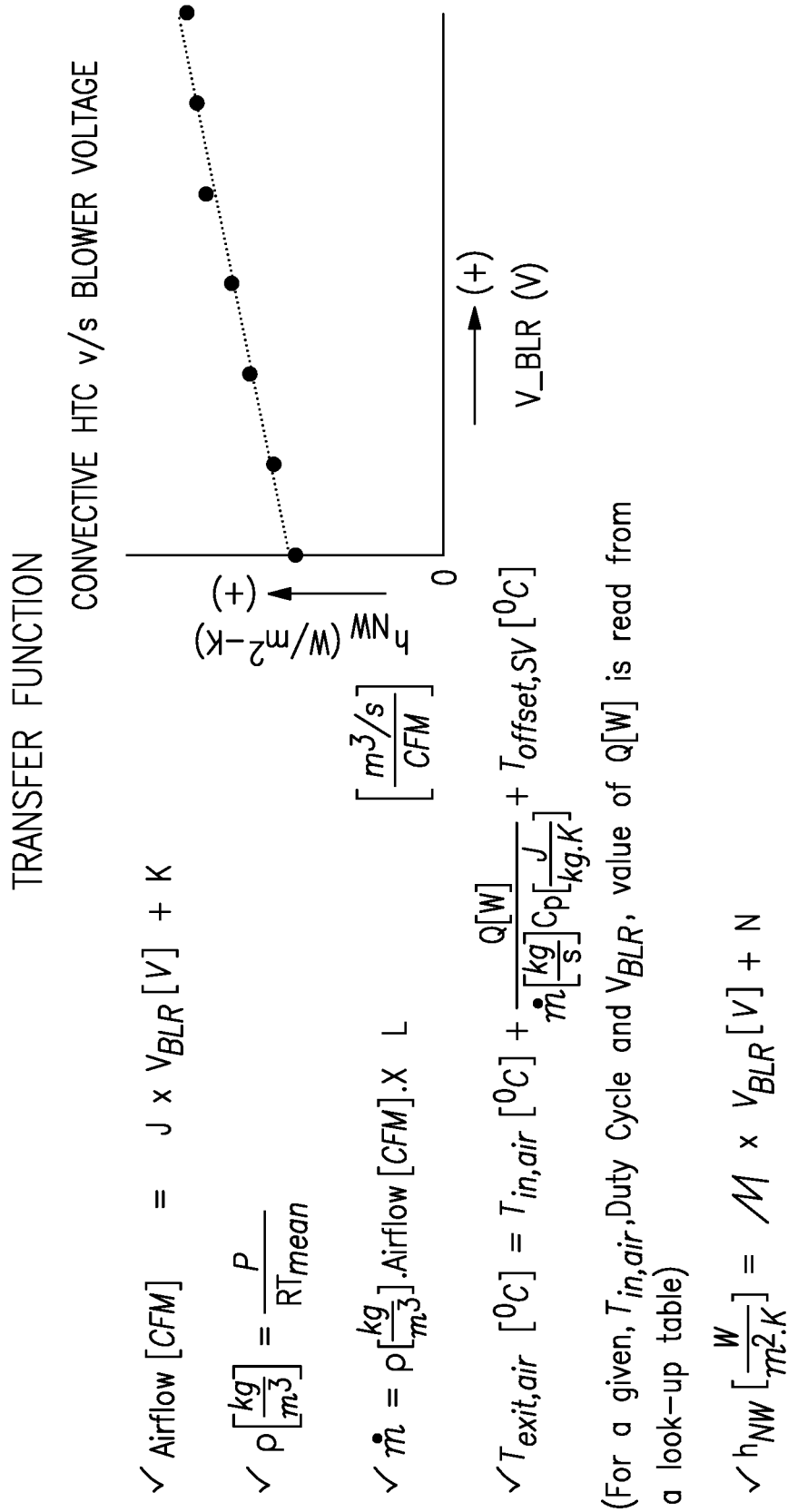
FIG. 2B illustrates a transfer function for the neck warmer control shown in FIG. 2A.

An example for such a transfer function and its output from one of the heat transfer models is shown in FIGS. 2A and 2B, which relates to a neck warmer. For a neck warmer incorporating a positive temperature coefficient (PTC) heater, a blower moves air across the PTC. Referring to FIG. 2A, the inlet air Tcabin (FIG. 2B: $T_{in,air}$) to the PTC as well as the velocity $V_{BLR}$ of the conditioned exit air are provided as inputs to a transfer function 199'. The performance of the neck warmer is affected by the voltage % $DC_{PTC}$ provided to the thermal effector. Accordingly, a dimensionless factor relating to the supply voltage, SV, is used in determining a temperature offset $T_{offset,SV}$ (FIG. 2B) attributable to the particular voltage provided to the thermal effector from the vehicle's power source. This dimensionless factor SV is 1 for voltages to the thermal effector greater than 13.5 volts and −1 for voltages to the thermal effector less than 13.5 volts. The temperature offset can be determined empirically by testing the thermal effector in a temperature controlled chamber at different voltages and temperatures.

The transfer function for the neck warmer is modeled to provide the equations shown in FIG. 2B, which provides offsets and gains J, K, L, M, N, for example. The transfer function models the relationship between the heat transfer $h_{NW}$ and the blower velocity $V_{BLR}$.

Figure 2C:
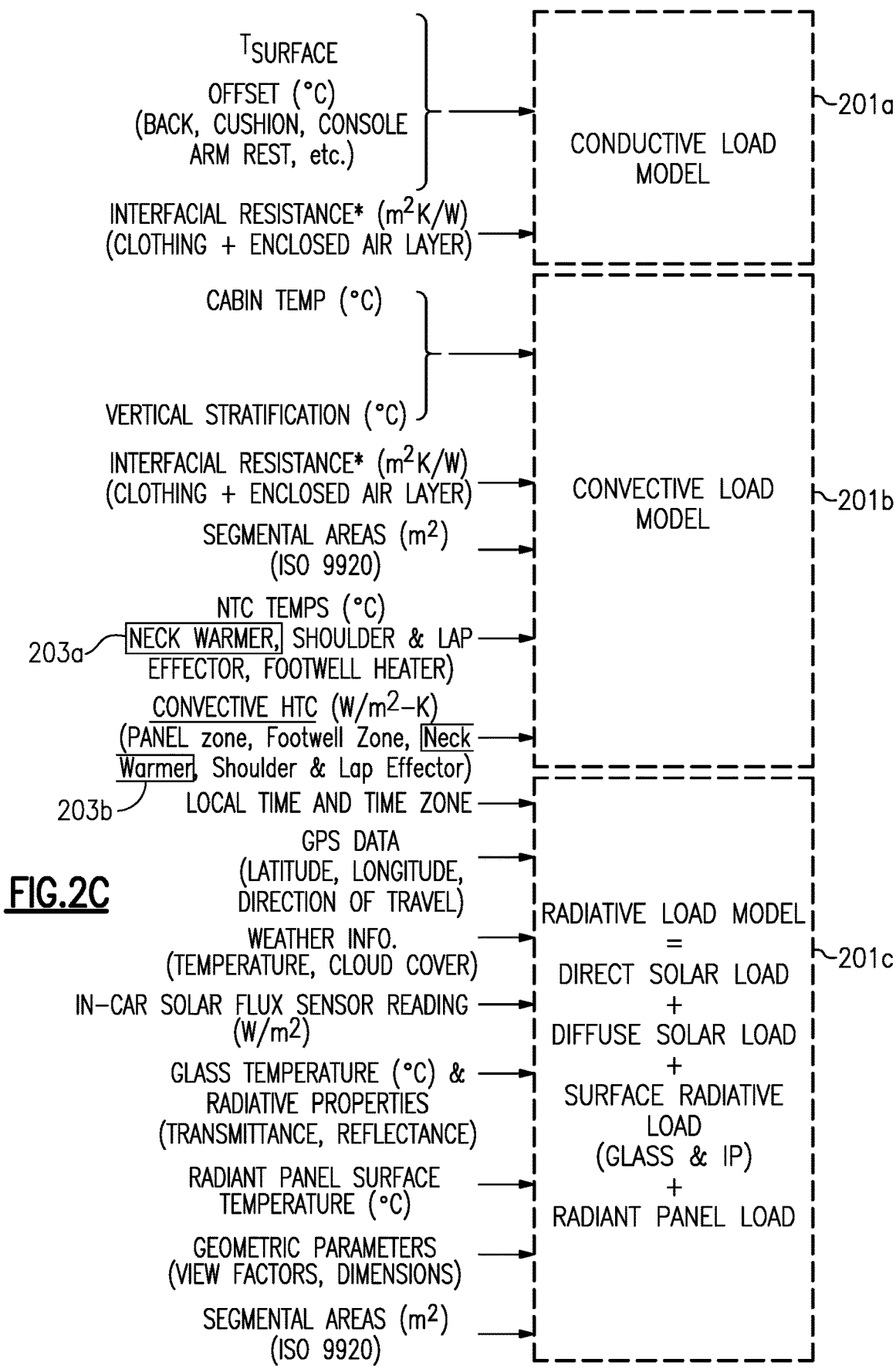
FIG. 2C depicts various energy balance inputs for conductive, convective and radiative load models for the architecture illustrated in FIG. 2.

With reference to FIG. 2, physical models 201 capture interaction between the environment, the thermal effectors and the occupant in order to capture the overall energy balance at the human level. The physical model 201 is the summation of the conductive model 201a, the convective model 201b, and the radiative model 201c. Example inputs to these physical models, some of which may be outputs of the transfer functions, are shown in FIG. 2C. For example, the exit air temperature 203a (FIGS. 2A & 2B: $T_{exit, air}$; FIG. 2C: NTC Temp, Neck Warmer) and heat transfer 203b (FIGS. 2A & 2B: $h_{NW}$; FIG. 2C: Convective HTC, Neck Warmer) are outputs of the neck warmer transfer function 199' and inputs to the convective model 201b. The radiative load model 201c is largely dependent upon the solar load on the vehicle through the vehicle's glass and the resultant thermal radiation generated by large components, such as the instrument panel (IP).

The differential temperature between the EHT and a temperature set point relates to the heat flux between the occupant and their surroundings. The heat flux on the occupant can be inferred from this differential temperature. The heat flux can be translated into the occupant's thermal comfort, for example, an overall thermal sensation. Overall thermal sensation is a measure of the thermal sensation experienced by a particular occupant based upon the heat transfer rates to their body. An occupant's thermal condition can be expressed using the PMV (Predicted Mean Vote) scale as described in, for example, P. O. Fanger "Thermal comfort: analysis and applications in environmental engineering", McGraw Hill 1970,225-240, ISBN: 0070199159. The PMV scale numerically represents thermal sensation as: −3 cold, −2 cool, −1 slightly cool, 0 neutral, 1 slightly warm, 2 warm, 3 hot. Another example is the Berkeley Sensation and Comfort Scale ("Berkeley scale"), described in, for example, Arens E. A., Zhang H. & Huizenga C. (2006) Partial- and whole-body thermal sensation and comfort, Part I: Uniform environmental conditions. *Journal of Thermal Biology*, 31, 53-59. The Berkley scale numerically represents thermal sensation as: −4 very cold, −3 cold, −2 cool, −1 slightly cool, 0 neutral, 1 slightly warm, 2 warm, 3 hot, 4 very hot. It should be understood that other approaches can be used to quantify an occupant's thermal condition. Overall thermal sensation (OTS) is a measure of the thermal sensation experienced by a particular occupant based upon the total heat transfer rates from the environment to their body.

Figures 4, 4A:
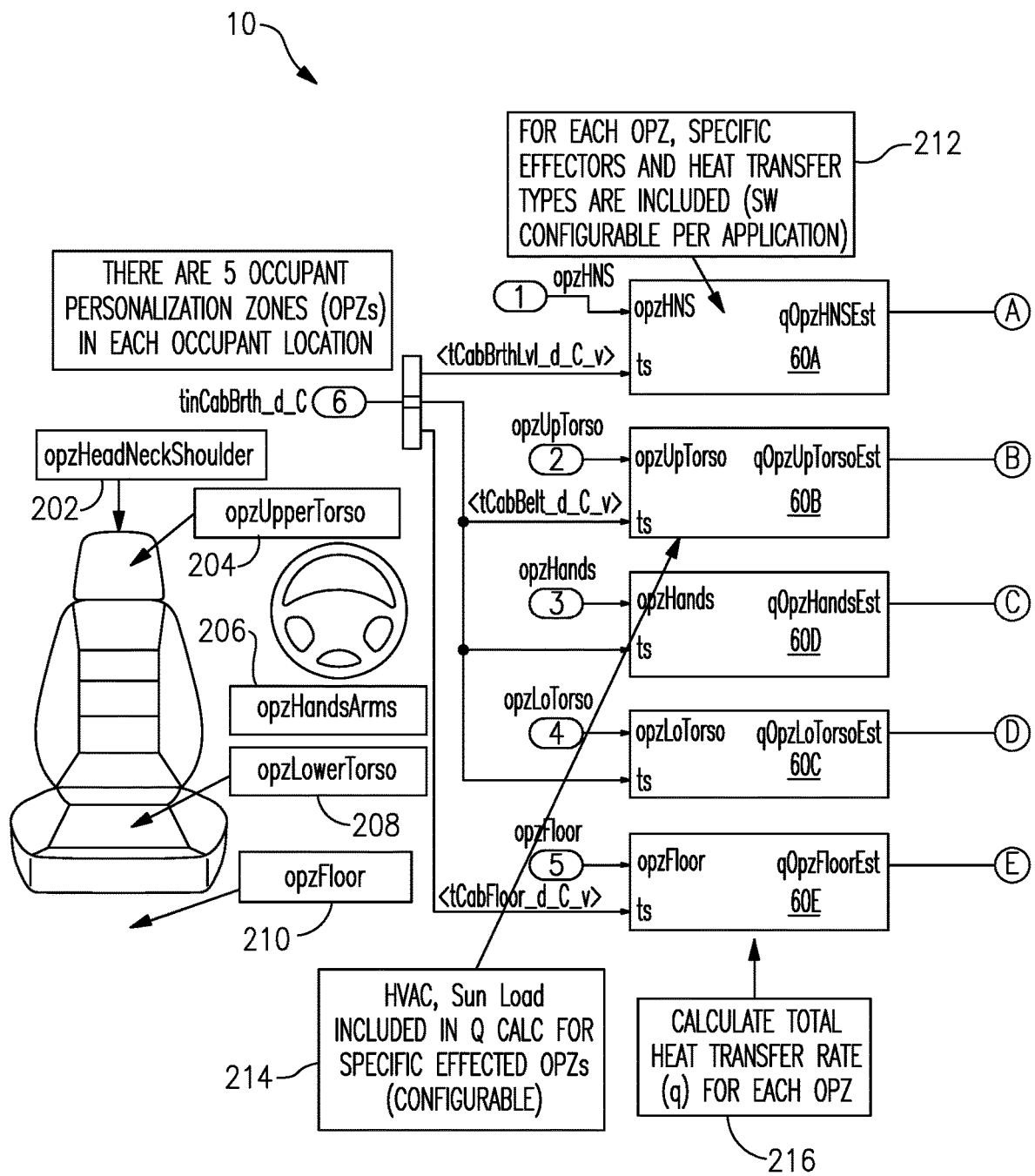
FIG. 4 is a diagram illustrating how
FIGS. 4A, 4B, and 4C are arranged.

An example microclimate system may have many discrete occupant microclimate zones in order to properly assess individual occupant comfort. According to ISO 145045-2: 2006 (E), a human body can be divided into more than 17 different body segments, such as hand, head or chest, and each segment has a different thermal comfort temperature range. However a human being wishing to personalize their micro-climate may prefer to indicate their temperature or heat preferences using a smaller number of zones. Therefore it is necessary to translate the complex human zonal thermodynamic model necessary for the determination of occupant comfort, to a lower order which can accept and adapt the entire coordinated comfort control system to those specific user preferences. The five example zones in FIG. 1 are: head (FIG. 5, 202), back (FIG. 5, 204), cushion (thigh and buttocks) (FIG. 4A, 208), foot/leg (FIG. 4A, 210), and arm/hand (FIG. 4A, 206). Fewer, more and/or different zones may be used if desired.

A few exemplary microclimate thermal effectors are schematically illustrated in FIG. 1. Other thermal effectors include, but are not limited to, for example, climate controlled seats (e.g., U.S. Pat. Nos. 5,524,439 and 6,857,697), a head rest/neck conditioner (e.g., U.S. Provisional App. No. 62/039,125), a climate controlled headliner (e.g., U.S. Provisional App. No. 61/900,334), a climate controlled door panel and/or instrument panel, a steering wheel (e.g., U.S. Pat. No. 6,727,467 and U.S. Pub. No. 2014/0090513), a heated gear shifter (e.g., U.S. Pub. No. 2013/0061603, etc.), heater mats, and/or a mini-compressor system to achieve a personalized microclimate. The microclimate system provides desired occupant personal comfort in an automated manner with little or no input from the occupant. All or some of these devices can be arranged to optimally control the thermal environment around an individual occupant of a seat located uniquely and anywhere inside a passenger vehicle. In addition, these components can be used to regulate thermal comfort separately for individual segments of the occupant's body according to user preference or effectiveness of devices or based on the duration of control.

Figure 3:
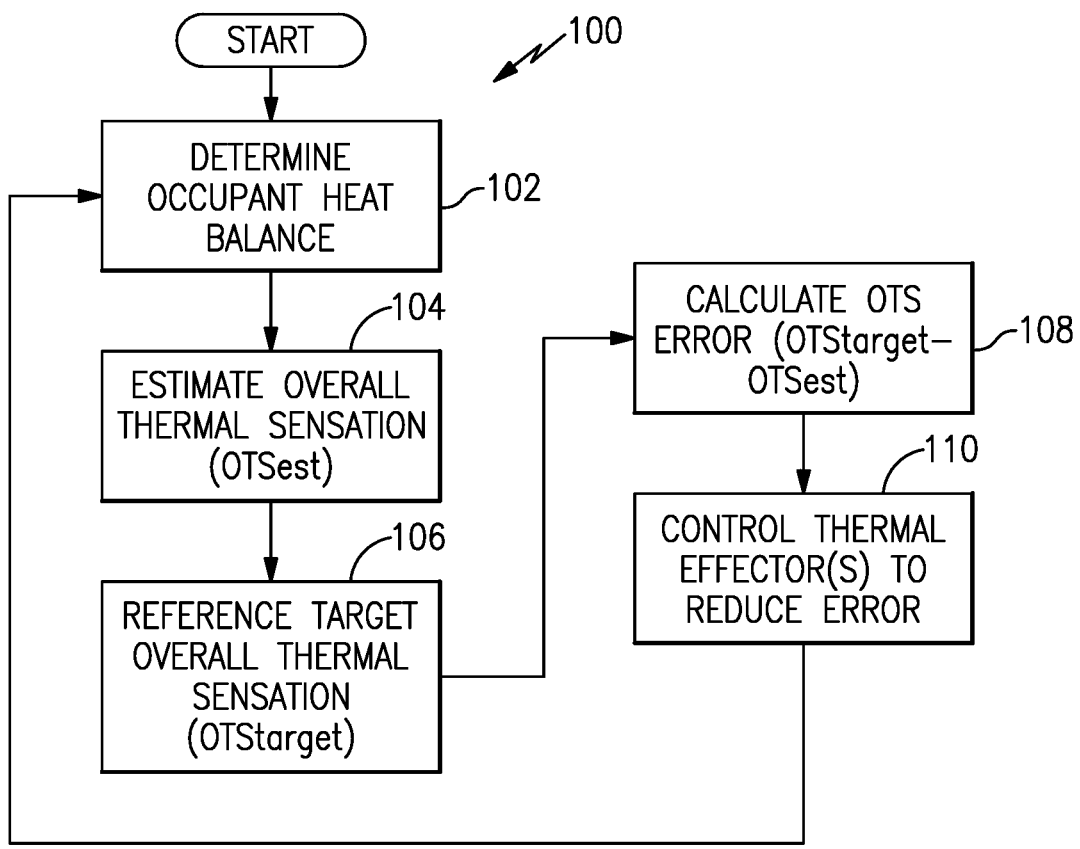
FIG. 3 is a flow chart that depicts an example method for controlling a plurality of microclimate thermal effectors.

The system 10 illustrated in FIG. 1 is schematically depicted in FIGS. 2 and 4, which demonstrates the overall heat (e.g. energy) balance or transfer between the environment and the occupant. FIG. 2 conceptually illustrates the system, while FIG. 4 depicts the control system. FIG. 3 shows the method 100 of controlling the system. The heat balance (FIG. 3, 102) may utilize input from at least one thermal effector in the at least one zone. Example inputs from the thermal effectors in at least one zone (FIG. 4A, 202-214) may include microclimate local set points (Tseat surface, Tcushion surface; Vseat surface, V seat cushion; Tair impinging occupant's neck; Vneck; Fij) and macroclimate set points (TsetHVAC: T, v, set). For each zone, software is configured to account for the specific effectors and their heat transfer mechanisms (FIG. 4A, 212). Further inputs for the heat balance may include occupant information (height, weight, gender, clothing) and ambient and cabin conditions (geometry, Fij solar, load, location, etc). The heat balance is preferably a sum of convection, conduction and radiation sources on the occupant corresponding to an occupant heat loss (or gain), which may be calculated by summing the heat transfer rate for each zone (FIG. 4A, 216). In one example, there may be a positive heat transfer in one zone, and negative in another zone. The heat balance may include models for each of the convection, conduction and radiation sources that utilize one or more of the inputs.

This total heat transferred (FIG. 3, 102) to the occupant may be described in terms of zonal EHTs, wherein the equivalent homogeneous temperature of a combination of zones that make up the human body can be mathematically combined to adequately describe the total heat transfer to the body. A single EHT can be determined for each occupant, and in this case this equivalent temperature simplifies the model and avoids calculating the individual temperatures on a zone-by-zone basis. Also, the heat balance on the occupant may be determined at least in part by using a Predicted Mean Vote, which is used as the OTS scale.

Referring to FIG. 2 in connection with FIG. 3, a method of controlling an occupant microclimate environment is employed to achieve an equilibrium point for occupant thermal comfort using a comfort estimate to automatically arrive at new local temperature set points for the microclimate thermal effectors, as needed. Depending upon the level of integration with the vehicle, the disclosed method may also adjust the vehicle's bulk heating and cooling (TsetHVAC).

Figure 4B:
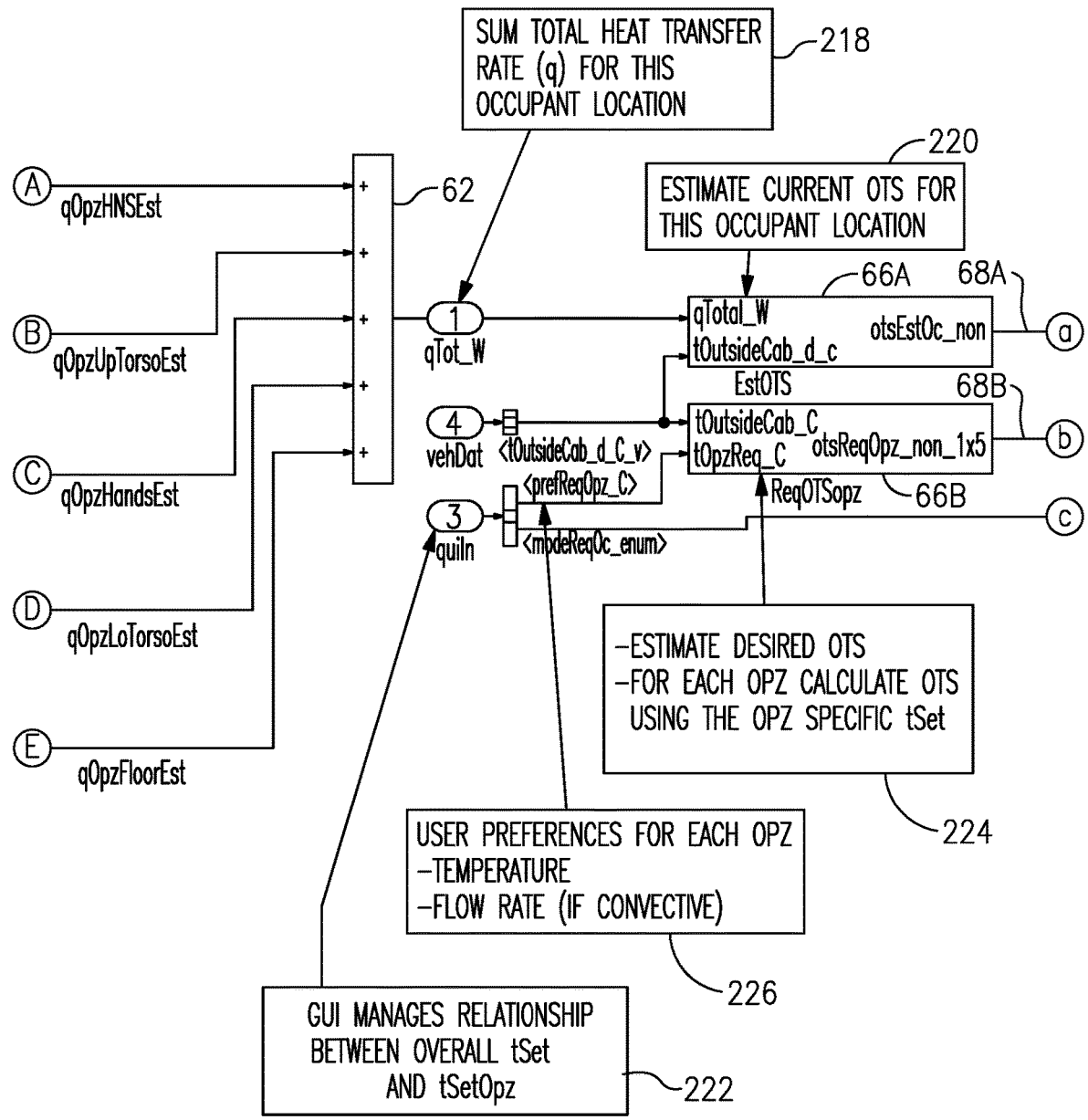
Figure 4C:
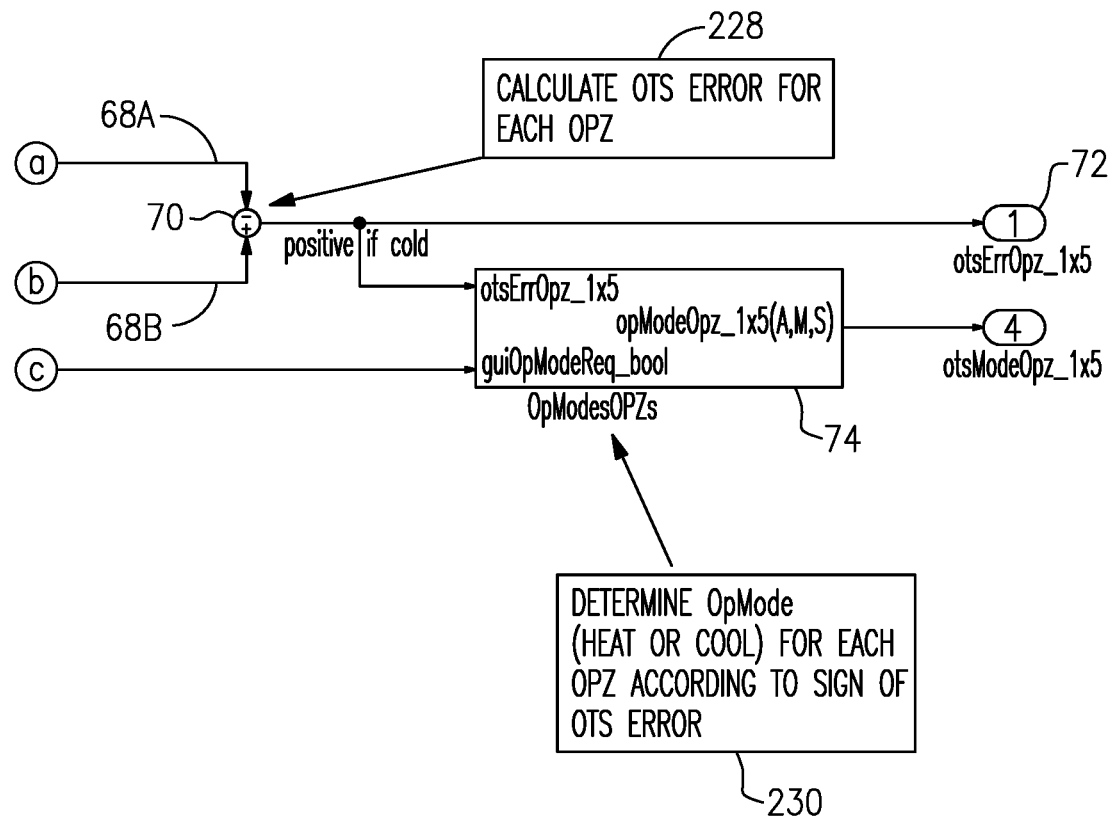

With reference to FIGS. 3 and 4, a heat balance (FIG. 3, 102) is determined for an occupant in a microclimate environment based upon a thermal model of the heat transfer effects on the occupant. FIG. 4 is a diagram illustrating an example arrangement for determining OTS_est and OTS_target, which includes FIGS. 4A, 4B, and 4C. Referring now to FIGS. 4A, 4B, and 4C, a respective estimator 60A-E for each OPZ 42 calculates a total heat transfer rate (Q) for its respective OW 42. Optionally, some of the estimators 60 may account for thermal conditioning from the HVAC system 12 and/or a sun load experienced by the vehicle when the HVAC system 12 and/or sun load have a significant effect on the OPZ 42. In particular, the estimator 60B may benefit from such consideration, since the upper torso of the vehicle occupant 50 is likely to be effected by these factors. The respective estimator 60 output their OPZ-specific heat transfer rates which are summed by a summing device 62 to determine an overall heat transfer rate 64. The summing device 62 combines the heat transfer for each of the OPZs zones to understand the total heat transfer to or from the vehicle occupant 50. Sum of heat transfer rate (q) for this Occupant Location 218 combines the heat transfer for each of the several zones to understand the total heat transfer to or from the occupant. This total heat transfer to the occupant can then be used to calculate other metrics to quantify the occupant's thermal comfort (ex. OTS, EHT, Predicted Mean Vote (PMV) and Predicted Percentage of Dissatisfied (PPD), etc.) and then to control the system accordingly.

From this heat balance, an overall thermal sensation of the occupant is estimated (OTSest; FIG. 3, 104). OTS is the preferred methodology for this embodiment (shown in "Estimate current OTS for this Occupant Location", 220, FIG. 4B). A first OTS calculator 66A takes that total heat transfer from the summing device 62 and calculates OTS_est and provides OTS_est as an output a. A second OTS estimator 66B determines an OTS_target for the vehicle occupant 50 and provides OTS_target as an output b. The estimator 66A bases its determination on user preferences (e.g., from a graphical user interface) and/or a power budget for the various microclimate thermal effectors 40.

A summing device 70 determines the difference between the OTS_target and OTS_est to determine an OTS error 72 which the controller 44 uses to determine setpoints for the various thermal effectors 40. An OTS mode module 74 determines whether each thermal effector 40 will provide heating or cooling based on the OTS error 72, and further based on any occupant-provided temperature offsets (e.g., OPZ-specific temperature offsets). Thus, heat transfer from all of the zones for an occupant are combined to get a total heat transfer to or from the occupant. This estimation may rely upon EHT to determine a differential temperature from which a heat flux (HeatLoss$_{Body}$) can be inferred, the heat flux being indicative of the estimated overall thermal sensation. In one example, the estimated overall thermal sensation is represented by the equation $$OTSest = \frac{6}{1 + \exp(-A \times (HeatLoss_{Body} + B))} - 3,$$

wherein HeatLoss$_{Body}$ corresponds to the heat flux of each occupant in the microclimate environment, and A and B are coefficients relating to seasonal effects on the heat flux. The equation is in the form of a sigmoid function with terms related to specific occupant thermal characteristics in combination with the calculated heat loss to the occupant's body. The resulting value from this equation is a number on the PMV scale.

Figure 7:
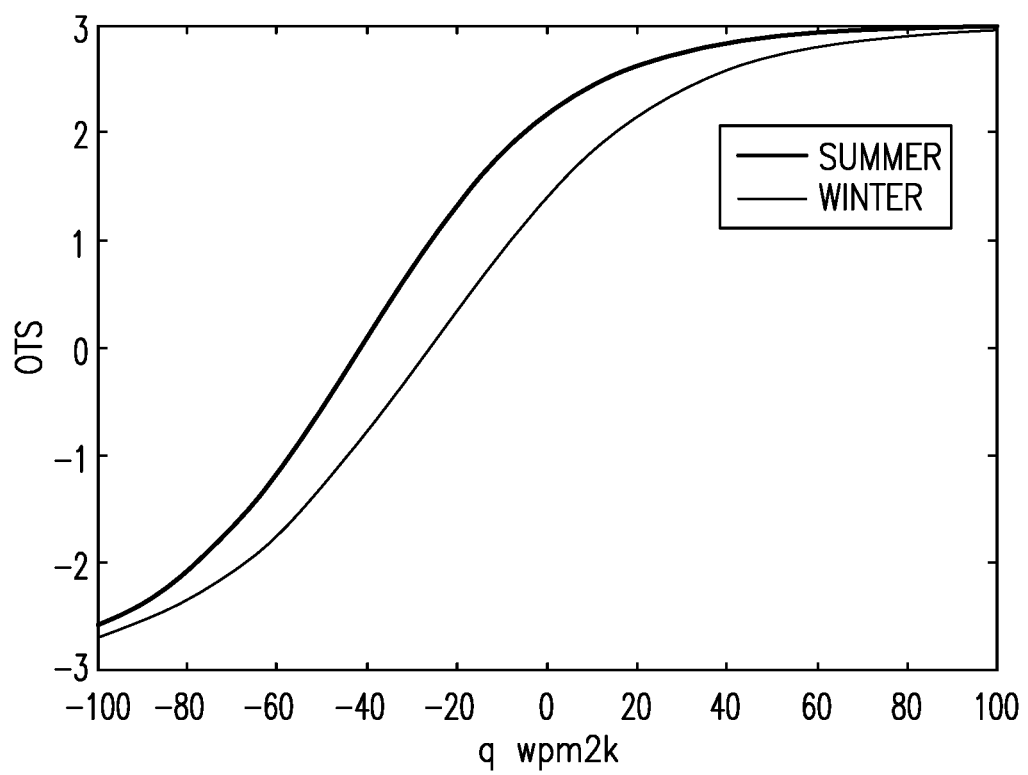
FIG. 7 is a graph depicting an example of how an overall thermal sensation (OTS) experience by a vehicle occupant can vary between seasons.

FIG. 7 illustrates the seasonal effects on the heat flux which relates to the overall thermal sensation. These seasonal effects (based upon coefficients A and B) are influenced by the clothing resistance between the occupant and the microclimate environment.

A target overall thermal sensational of the occupant is referenced (OTStarget; FIG. 3, 106). The total heat transfer to or from the occupant is then utilized to control the effectors in each zone. See step "Estimate Desired OTS" (FIG. 4B, 224), where based on the preferences (from GUI or other user input device) or power budget or a ranking based on the relative effectiveness of available heating and cooling devices, the desired OTS (or EHT) for each zone is calculated. This target overall thermal sensation can be provided by a default value, which may be a near-neutral value, such as 1. Although fully automated operation is desired, the default value may be adjusted by the individual occupant using manual adjustments to a climate control input, such as a temperature setting to the HVAC or one of the thermal effectors (FIG. 4B, 222 & 226).

Figure 5:
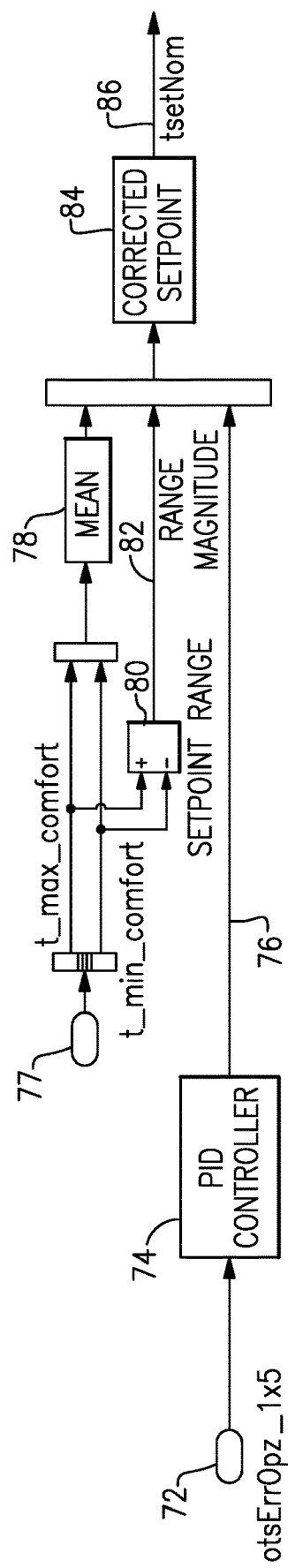
FIG. 5 is a diagram illustrating an example arrangement for determining a corrected temperature setpoint.

FIG. 5 is a diagram illustrating an example arrangement for determining a corrected temperature setpoint based on the OTS error 72 shown in FIG. 4C. The diagram in FIG. 5 can be used to perform step 212 in FIG. 6, for example. The OTS error 72 is provided to a proportional-integral-derivative (PID) controller 74 which is configured to analyze the OTS error 72, and provide an OTS error output 76 that is based on a proportional term, integral term, and derivative term, using known PID control techniques. Each of these terms is unique to each effector, in one example. The integral term (not shown in FIG. 5, and which is characterized by an accumulation of the OTS error 72), and the derivative term (not shown in FIG. 5, and which is characterized by a rate of change of OTS error 72 over time). The example discussed below assumes that the integral and derivative terms are 0, but it is understood that non-zero values could be used for those terms using known PID control techniques.

A thermal conditioning range 77 that includes a maximum temperature (t_max_comfort) and a minimum temperature (t_min_comfort) is provided. As an example, assume that the t_max_comfort for a particular OPZ 42 is 10° C. and that t_min_comfort for the particular OPZ 42 is 0° C. Block 78 determines a mean of the values (5° C. in this example), and block 80 determines a magnitude 82 of the range (10° C. in this example). Block 84 determines a corrected setpoint (tsetNom) 86 based on these inputs. In one example, block 84 uses equation 3 below.

$$tsetNom = u(1) + (u(2)*u(3))/100$$

where u(1) represents the nominal setpoint;
u(2) represents the range magnitude; and
u(3) represents the OTS error output 76.

Using the example values discussed above, u(1) would equal 5° C. and u(2) would equal 10° C. For the sake of discussion, assume that the OTS error output 76 corresponding to u(3) is a 20% error (indicating that OTS_target is 20% higher than OTS_est). Using these values, tsetNom would equal (5+(10*20)/(100), or 7° C.

Figure 6:
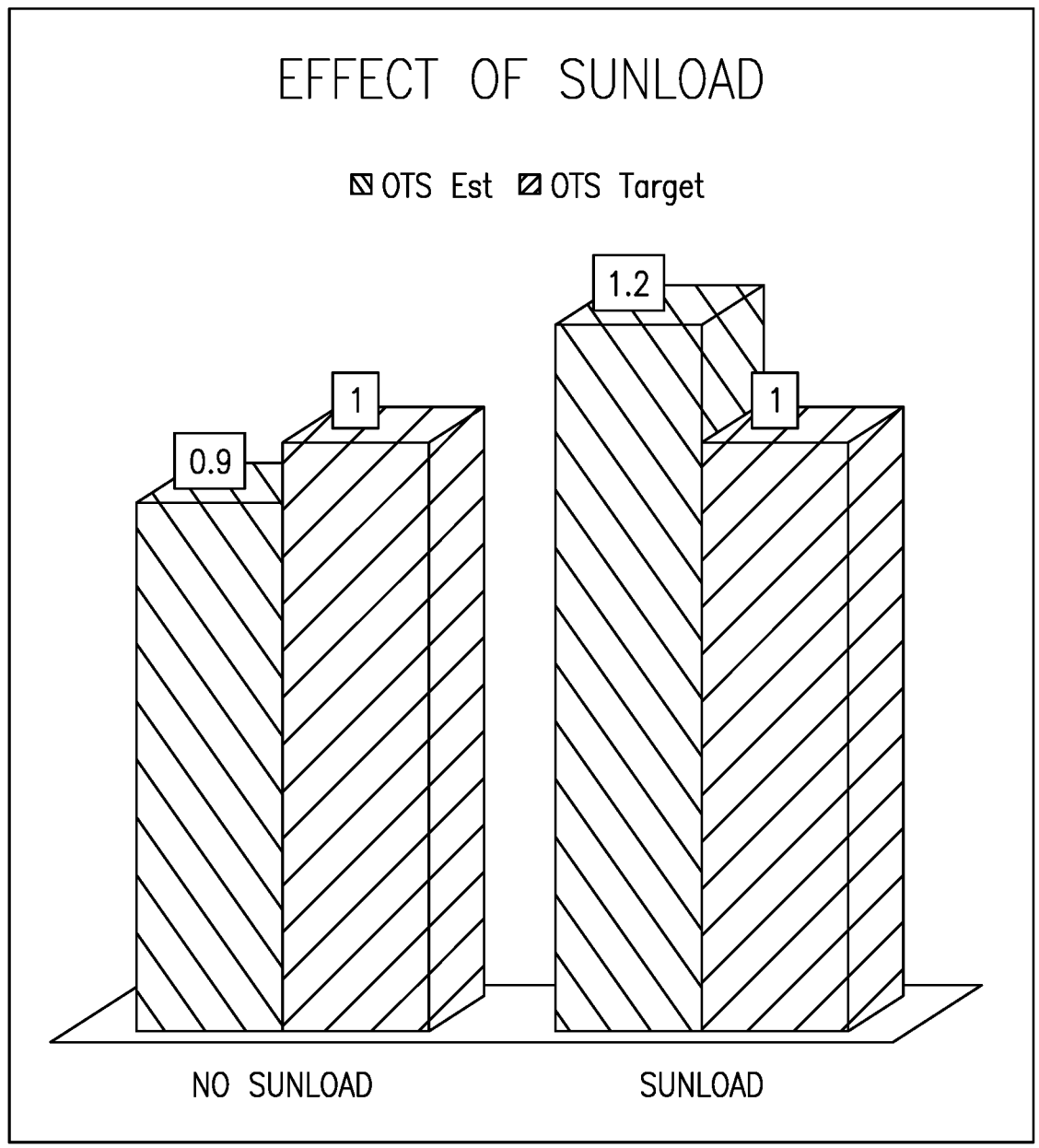
FIG. 6 is a diagram illustrating an example effect that sun load can have on OTS.

The difference between the Estimated Current OTS and Desired OTS are calculated (FIG. 3, 108) and system determines how to operate the effectors (heat and cool) and parameters. An error is calculated (FIG. 4C, 228) between the estimated thermal sensation (OTSest) and the target overall thermal sensation (OTStarget). FIG. 6 illustrates the effects of sun load on the overall thermal sensation error. At least one thermal effector in the microclimate system is controlled in at least one zone to reduce the error. Although the OTS error can be calculated for each zone of the multiple zones, it is simpler to calculate a single OTS error for the entire microclimate system. This single OTS error can then be applied on a zone-by-zone basis to adjust the thermal effector(s) in each zone (FIG. 3, 110). Alternatively, the error for each zone can be separately calculating resulting in different errors in the multiple zones. This may result in different heating and/or cooling throughout the multiple zones. The user input preferences are limited and act as a small local disturbance to the generalized global controller which adjusts the total heat flux to achieve the OTS target. The preferences just adjust the relative contributions of individual devices according to specific user preferences.

One possible software implementation, results in a positive OTS error being indicative of an occupant whose state is currently cooler than they prefer, while and a negative error being indicative of an occupant whose state is currently warmer than they prefer. So, with a positive error at least one thermal effector in the zone is activated to warm the occupant and other thermal effectors used to cool the occupant are inactive. Conversely, with a negative error the at least one thermal effector is activated to cool the occupant and other thermal effectors used to warm the occupant are inactive.

The thermal effector controlling step (FIG. 3, 110) can be performed based upon a power efficiency ranking of the multiple thermal effectors and their ranking based on effectiveness of each component in providing thermal comfort (FIG. 4C, 230). That is, the overall power budget for the microclimate system is considered and, based upon thermal effector constraints (e.g., temperature set point limits and the resultant power consumption), certain thermal effectors of the available thermal effectors may be used to reduce the error in the zone. In one example, less effective devices are turned off and only a few more effective devices are used at full or high power. An additional method used is to weight the error determined in OTS so that more effective devices are preferred and have higher setpoints than less effective devices. This means all heating devices can be used for heating for example but the best/preferred ones dominate and the inefficient less preferred ones have reduced use (saving power or annoyance). The controlling step may include selecting which thermal effectors to operate, the set points for airflow, where applicable for the convective thermal effectors, and temperature set points. Specifically, the control step can be operated for the purpose of efficiency (reduce electrical power consumption—especially important for range of electric vehicles but still significant for energy consumption in any vehicle) or maximum comfort (minimize the OTS error as quickly as possible). Also, thermal effector controlling step could balance the efficiency and maximum comfort purposes (maximum comfort within a power budget).

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of controlling an occupant microclimate environment comprising:
   determining a heat balance on an occupant in a microclimate environment based upon a thermal model of the heat transfer effects on the occupant;
   estimating an overall thermal sensation of the occupant based upon the heat balance;
   referencing a target overall thermal sensation of the occupant;
   calculating an error between the estimated overall thermal sensation and the target overall thermal sensation; and
   controlling at least one thermal effector in at least one of multiple zones in the microclimate environment to reduce the error in overall thermal sensation while maintaining all effectors within limits of temperature and flow rate that ensure occupant comfort, each of the multiple zones corresponding to only a segment of the occupant's body, the multiple zones included at least several of a head zone, a seat back zone, a seat cushion zone, a hand/arm zone and a foot/leg zone, wherein the at least one thermal effector includes at least one of a-climate controlled seats, a head rest/neck conditioner, a climate controlled headliner, a steering wheel, a heated gear shifter, a door panel, a heater mat;
   wherein the estimated overall thermal sensation is represented by the equation $$OTSest = \frac{6}{1+\exp(-A \times (HeatLoss_{Body} + B))} - 3,$$

wherein $HeatLoss_{Body}$ corresponds to the heat flux of the occupant in the microclimate environment, and A and B are coefficients relating to seasonal effects on the heat flux.

2. The method of claim 1, wherein the heat balance is a sum of convection, conduction and radiation on the occupant corresponding to an occupant heat loss.

3. The method of claim 2, wherein the heat balance is calculated based upon exterior vehicle temperature, cabin temperature and occupant information.

4. The method of claim 3, wherein the occupant information includes at least three of occupant weight, occupant height, occupant gender and occupant clothing.

5. The method of claim 3, wherein the heat balance includes thermal input from the at least one thermal effector in the at least one zone, wherein the thermal input is provided as a transfer function of the at least one thermal effector.

6. The method of claim 5, wherein the heat balance on the occupant is determined using an equivalent homogeneous temperature.

7. The method of claim 1, wherein the estimated occupant thermal sensation and the target occupant thermal sensation are quantified using the Predicted Mean Vote scale.

8. The method of claim 1, wherein the target overall thermal sensation is provided by a default value as adjusted by any manual adjustments by the occupant via a climate control input.

9. The method of claim 8, wherein the error is a difference between the target occupant thermal sensation and the estimated occupant thermal sensation, wherein a positive error is indicative of a cool occupant and a negative error is indicative of a warm occupant, wherein with a positive error the at least one thermal effector is activated to warm the occupant and other thermal effectors used to cool the occupant are inactive, and with a negative error the at least one thermal effector is activated to cool the occupant and other thermal effectors used to warm the occupant are inactive.

10. The method of claim 1, wherein each of the multiple zones having at least one thermal effector.

11. The method of claim 10, wherein the multiple zones includes at least three zones.

12. The method of claim 10, wherein the at least one thermal effector includes at least three thermal effectors.

13. The method of claim 10, wherein the calculating step is performed for each zone of the multiple zones, and the controlling step is performed using the thermal effector in the each zone of the multiple zones.

14. The method of claim 13, wherein the heat balance on the occupant is determined using an equivalent homogeneous temperature, and the estimating step uses the equivalent homogeneous temperature to determine the estimated overall thermal sensation.

15. The method of claim 13, wherein calculating step determines different errors in the multiple zones, and the controlling step results in different heating and/or cooling in the multiple zones.

16. The method of claim 1, comprising multiple thermal effectors arranged in the microclimate zone, wherein the controlling step is performed based upon a power efficiency ranking of the multiple thermal effectors.

17. A controller configured to perform the method of claim 1.

18. A seating system comprising the controller of claim 17.

19. A vehicle comprising the seating system of claim 18.

* * * * *